United States Patent
Murakami et al.

(10) Patent No.: US 6,372,339 B1
(45) Date of Patent: Apr. 16, 2002

(54) SUBSTRATE FILM FOR ADHESIVE SHEET AND ADHESIVE SHEET USING THE SAME

(75) Inventors: Yoshihide Murakami; Katsuhiro Okada, both of Osaka (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 09/417,114

(22) Filed: Oct. 13, 1999

(30) Foreign Application Priority Data

Oct. 16, 1998 (JP) .......................................... 10-295377
Jan. 27, 1999 (JP) .......................................... 11-018750

(51) Int. Cl.⁷ .................................................. C09J 7/02
(52) U.S. Cl. ..................... 428/343; 428/143; 428/149; 428/402
(58) Field of Search ............................... 428/343, 143, 428/149, 402

(56) References Cited

U.S. PATENT DOCUMENTS 3,870,593 A * 3/1975 Elton et al. ................. 161/159
4,769,283 A    9/1988 Sipinen et al.

FOREIGN PATENT DOCUMENTS

| CH | 579 626 A | 9/1976 |
| DE | 196 30 231 A1 | 1/1998 |
| GB | 1 226 841 A | 3/1971 |
| WO | WO 97/12006 | 4/1997 |

OTHER PUBLICATIONS

Search Report.
Patent Abstract of Japan vol. 1998, No. 05, Apr. 30, 1998 & JP 10 006442 A (Sekisui Chem Co. Ltd.), 13, Jan. 1998.
Database WPI Section Ch, Week 198130 Derwent Publications Ltd., London, GB; Class A14, AN 1981–54284D XP002152540 & JP 56 069158A (Mitsui Toatsu Chem Inc.), Jun. 10, 1981 (1981–06–10) Abstract.

* cited by examiner

Primary Examiner—Daniel Zirker
(74) Attorney, Agent, or Firm—Sughrue Mion, PLLC

(57) ABSTRACT

A substrate film for an adhesive sheet containing an elastomer resin and a hydrophilic polymer having a tensile modulus of elasticity higher than that of the elastomer resin and/or 8 to 100 parts by weight per 100 parts by weight of the elastomer of inorganic fine particles having an average diameter size of 15 μm or less are added. An adhesive sheet is formed by providing an adhesive layer on the film. The adhesive sheet prepared using the film containing the hydrophilic polymer as a substrate has sufficient flexibility and sufficient skin follow-up property after its application, while sufficiently satisfying processability in producing the adhesive sheet and handling property in adhering. The adhesive sheet prepared using the inorganic fine particles as a substrate has a tensile strength which allows to easily cut the sheet by hands, exhibits an appropriate stress in slight deformation, and is easily handled in adhering, while securing an appropriate slipperiness and barrier property against microorganisms or the like.

21 Claims, No Drawings

SUBSTRATE FILM FOR ADHESIVE SHEET AND ADHESIVE SHEET USING THE SAME

BACKGROUND OF THE INVENTION

1. Field of the Invention

The present invention relates to a substrate film for an adhesive sheet and to an adhesive sheet using the same. More specifically, the invention relates to a substrate film for an adhesive sheet, that is used as a support (substrate) of, for example, a pressure-sensitive adhesive sheet for skin adhesion, and to an adhesive sheet.

2. Description of the Related Art

As a support (substrate) of an adhesive sheet applied to a curved, movable or bending surface, such as a skin, an elastomer film such as a polyurethane film having high rubber-like elasticity, or a flexible vinyl chloride film having an increased flexibility by using a plasticizer has been used for the reason that such a film follows up to a skin satisfactorily.

However, the flexible vinyl chloride film has had the problems that it follows up to the elongation and contraction of a skin insufficient yet, and after it is applied a stretch feeling or a skin irritation during adhering tends to develop, and further, since its flexibility is insufficient, there is the problem that edge portions of the film are liable to peel during its application. In addition, there has been the problems that the phenomenon of migration of a plasticizer in the film into an adhesive tends to occur, so that a film having a sufficiently stable quality is not obtained.

The elastomer film has the defect that stress when receiving small deformation is relatively small as compared with stress when receiving large deformation, thus showing a rubber elasticity, and as a result, a so-called stiffness of a film is weak, a support twists, or wrinkles tend to occur. Consequently, the elastomer film also has the defect that the processability of the film while it is being produced is poor, and the operation of applying the film is difficult since adhesive surface portions stick each other when applying a pressure-sensitive adhesive sheet to a skin.

This problem can be solved by temporarily adhering and supporting the adhesive sheet on a separate film or sheet having a sufficient stiffness before its supply and use. However, the elastomer film still has the problems that its production step or adhering work is complicated, cost of a film or an adhesive sheet increases, and wastes are generated.

Further, the elastomer film generally has a large surface abrasion resistance. Therefore, when it is used as a substrate for a pressure-sensitive adhesive sheet for skin adhesion, the problem has been pointed out that a difference between the slipperiness of skin surface and the slipperiness of the elastomer film is big, so that uncomfortable feeling when it is applied to the skin increases, and the pressure-sensitive adhesive sheet is liable to peel off by rubbing with cloths, etc.

SUMMARY OF THE INVENTION

The present invention has been made in view of the above-described problems.

Accordingly, one object of the present invention is to provide a substrate film suitable for an adhesive sheet which sufficiently satisfies the processability in producing an adhesive sheet and adhering property even without a temporary adhering support, and also has a sufficient flexibility in adhering and skin follow-up property.

Another object of the present invention is to provide an adhesive sheet having improved adhesion to a skin by using the above film as a substrate.

As a result of extensive investigations, it has been found that the objects of the present invention can be attained by inclusion of a specified modifier in an elastomer resin having a flexibility.

The specified modifier used in the present invention includes a hydrophilic polymer having a tensile modulus of elasticity higher than that of the elastomer resin, and inorganic fine particles having an average particle diameter of 15 µm or less.

In other words, the objects of the present invention can be attained by using a mixture of the elastomer resin and a polymer which is higher in elasticity than the elastomer resin and has a water absorption ability.

Further, by blending a specified amount of inorganic fine particles such as zeolite with the elastomer resin, not only the objects of the present invention are attained and but also there can be provided a film having a break strength decreased to a level such that the film can easily be cut with hands, while maintaining sufficient barrier property required as a support of a pressure-sensitive adhesive sheet for skin adhesion.

A substrate film for an adhesive sheet of the present invention is characterized in that the film contains an elastomer resin, and at least one of a hydrophilic polymer having a tensile modulus of elasticity higher than that of the elastomer resin and inorganic fine particles having an average particle size of 15 µm or less.

Here, the elastomer resin may be a thermoplastic block polymer.

Further, the elastomer resin may be at least a member selected from the group consisting of polyester polyurethane, polyether polyamide, polyether polyurethane, and polyether polyester.

The hydrophilic polymer may be polyvinyl pyrrolidone.

Preferably, the hydrophilic polymer may be contained in a weight proportion of hydrophilic polymer:elastomer resin=2:98 to 40:60.

The film may have a water absorption of preferably 5 to 200%.

The tensile modulus of elasticity of the film in a saturated water absorption state may be 50% or less of a tensile modulus of elasticity in a dry state.

The inorganic fine particles may be dispersed in an amount of preferably 8 to 100 parts by weight per 100 parts by weight of the elastomer resin.

The inorganic fine particles may be zeolite or amorphous silica.

The film may have a tensile strength of preferably 12 to 28 MPa.

An adhesive sheet of the present invention, characterized in that an adhesive layer is formed on at least one surface of the substrate film for an adhesive sheet as the above.

Here, the sheet may be used for skin adhesion.

Other objects and advantages of the present invention will become apparent from the detailed description to follow taken in conjunction with the appended claims.

DETAILED DESCRIPTION OF THE INVENTION

In order to achieve the objects of the present invention, the substrate film for an adhesive sheet of the present invention is a film which comprises an elastomer resin as a base which has been modified.

That is, the substrate film for an adhesive sheet according to a first embodiment of the present invention is a film which comprises an elastomer and a hydrophilic polymer higher in elasticity than the elastomer and having water absorption as a blend, the film being formed in a state that the hydrophilic polymer is molten or dispersed in the elastomer resin.

When such a modified elastomer film is adhered to a skin, the hydrophilic polymer absorbs the moisture perspired from a skin or moisture in environment, so that the film exhibits a plasticity. As a result, when the film is formed as a pressure-sensitive adhesion sheet and adhered to a skin, the tensile modulus of elasticity of the substrate film for an adhesive sheet decreases, which improves the flexibility and skin follow-up property of the adhesive sheet.

On the other hand, during the production of the adhesive sheet, the hydrophilic polymer does not sufficiently absorb water, and it is therefore believed that the hydrophilic polymer can show a tensile modulus of elasticity substantially equal to, or rather larger than that of the elastomer resin alone. As a result, the mechanical strength of the film can sufficiently be maintained, and a film having more excellent processability and further higher flexibility than the conventional one can be obtained.

The substrate film for an adhesive sheet according to a second embodiment of the present invention is a modified elastomer film, i.e., a non-porous elastomer film which comprises an elastomer resin and inorganic fine particles having an average particle size of 15 µm or less dispersed therein in an amount of 8 to 100 parts by weight of per 100 parts by weight of the elastomer resin.

By the above-described modification, there can be provided an elastomer film which has an appropriate slipperiness and a tensile strength that allows easily cutting with hands without deterioration of barrier property of the elastomer film, and on the other hand, an appropriate stress at the time of a slight deformation, making the handling property in adhering easy.

That is, since the elastomer film has excellent characteristics of, for example, having high moisture permeability while having a barrier property against water or microorganisms, prevention of perspiration from a skin is less, and therefore, the elastomer film is useful as a support for a pressure-sensitive adhesive sheet for covering and protecting, for example, wound portions on a skin.

Various pressure-sensitive adhesive sheet products for skin adhesion are shipped in various forms, such as a form wound in a roll shape (e.g., a surgical tape), or a form cut in a predetermined size according to an application size. The surgical tape is used by cutting in an appropriate length or size according to the use purpose in various medical sites at the time of use, and thus has a merit that it is easily used according to the needs of the user. Further, the surgical tape has various merits on its production, such as processability or cost reduction.

However, if an elastomer film is used as a substrate, the film cannot easily be cut with hands due to high film strength, and it is necessary to use scissors or the like. Thus, the elastomer film is poor in ease of handling. If the film is perforated such that the film can be cut with hands, a barrier property of the film against microorganisms, etc. is lost. For this reason, this method could not be applied to a pressure-sensitive adhesive sheet used for covering and protecting wound portions. According to the substrate film for a pressure-sensitive adhesive sheet of the second embodiment of the present invention, the cutting by hands can be improved without deterioration of the barrier property.

The elastomer resin used in the present invention means a material that immediately restores the original shape in a substantial manner when an external force is removed, and includes a wide variety of materials generally used as elastomers.

The elastomer resin used in the present invention is not particularly limited. However, considering that it is used for a substrate of a sheet suitable for skin adhesion, elastomer resins having an elongation at room temperature of 50% or more and a tensile modulus of elasticity in a range of 1 to 100 MPa are preferable from the standpoint of adhesion to a skin and processability. For not preventing perspiration from a skin, it is desirable for the film to have a moisture permeability of 300 g/(m$^2$·day) or more. From those reasons, thermoplastic block polymers such as polyester polyurethane, polyether polyurethane, polyether polyamide or polyether polyester are suitably used.

In the present invention, the tensile modulus of elasticity means a value obtained by conducting a tensile test according to JIS K-7113.

The hydrophilic polymer that is molten in or mixed with the elastomer resin, used in the substrate film for an adhesive sheet according the first embodiment of the present invention is not particularly limited so long as it is a polymer that dissolves or swell in water. Polymers having high water absorption are preferably used. Examples of the hydrophilic polymer include polyvinyl pyrrolidone, polyethylene oxide, polyacrylic acid, polyvinyl alcohol, polyvinyl methyl ether-maleic anhydride copolymer, alginic acid, carboxymethyl cellulose, and crosslinked products of those various polymers.

In selecting those hydrophilic polymers, it is necessary that the tensile modulus of elasticity at drying of those hydrophilic polymers is a value higher than that of the elastomer resin used. As described above, the processability in producing the adhesive sheet can be maintained by mixing therewith the hydrophilic polymer having a high tensile modulus of elasticity.

In the present invention, it is intended to use those hydrophilic polymers in order to improve the flexibility by absorbing water upon use, and hydrophilic polymers that have a high water absorption rate and are easily plasticized are suitably used. Therefore, from those standpoints, polyvinyl pyrrolidone is particularly preferable as the hydrophilic polymer.

The hydrophilic polymer is used in a weight proportion of hydrophilic polymer:elastomer resin=2:98 to 40:60 (2/98 to 40/60). If the weight proportion of the hydrophilic polymer used is less than 2/98, viz., the amount of the hydrophilic polymer used is less than 2% by weight in the main component polymers forming a film, water absorption is too small, so that plasticization by water absorption does not greatly affect the physical properties of the entire substrate film for an adhesive sheet, and the expected effect of improvement in flexibility upon use cannot sufficiently be obtained. On the other hand, if the weight proportion of the hydrophilic polymer used is more than 40/60, viz., the amount of the hydrophilic polymer used exceeds 40% by weight in the main component polymers forming a film, the film obtained is poor in practical use for a support. That is, film strength greatly decreases due to plasticization, and the film surface becomes tacky. Further, problems may arise that a size deformation of a film becomes larger by swelling, and wrinkles occur during adhering to a skin when used as a pressure-sensitive adhesive sheet, so that the pressure-sensitive adhesive sheet is liable to peel off.

Thus, the substrate film for an adhesive sheet can be obtained by mixing the elastomer resin with the hydrophilic polymer having a tensile modulus of elasticity higher than that of the elastomer resin. Conventional film formation methods can be used as the method for obtaining the substrate film for an adhesive sheet. Examples of the method include a method of mixing the elastomer resin and the hydrophilic polymer with a non-aqueous solvent such as N,N-dimethyl formamide (DMF), stirring the resulting mixture, and then forming a polymer film by a solution casting method, and an extrusion method of kneading the elastomer resin and the hydrophilic polymer with a kneader while dissolving those under heating, and then forming a film using, for example, T die. Of course, the method for obtaining the substrate film for an adhesive sheet of the present invention is not limited to those methods. In the case of the solution casting method, it is preferable that as little as possible a water be absorbed by the hydrophilic polymer during film formation since it is difficult to adjust the water absorption of the polymer film finally formed, and therefore it is desirable to use a non-aqueous solvent, rather than an aqueous solvent. Use of such a non-aqueous solvent makes it possible to easily maintain a constant water absorption (or water content) of the polymer film.

Further, the substrate film for an adhesive sheet of the present invention, if necessary, may be subjected to an appropriate crosslinking treatment suitable for the elastomer resin and hydrophilic polymer used for the purpose of adjusting physical properties. For example, radiation irradiation, or a method of using various crosslinking agents such as peroxides (e.g., benzoyl peroxide), triglycidyl isocyanurate or epoxy compound, is used. The amount of the crosslinking agent is suitably 0.01 to 5% by weight based on the total weight of the elastomer resin and hydrophilic polymer. Further, for the same purpose as above, if necessary, plasticizers that can generally be used in general films, such as polyethylene glycol, polypropylene glycol, glycerin, polyglycerin or sorbitol; various organic and inorganic fillers such as silica, alumina, zinc oxide, calcium carbonate or ceramics; and other additives such as stabilizers, ultraviolet absorbents, pigments or coloring materials can appropriately be added in a range where the blending ratio of the elastomer resin and the hydrophilic polymer is not changed.

The substrate film for an adhesive sheet thus formed according to the first embodiment of the present invention is required to have a flexibility by sufficiently absorbing water in order to sufficiently attain the object of the present invention. To achieve the object, it is desirable that the substrate film for an adhesive sheet has a water absorption (measured according to the method as described in the examples hereinbelow) of 5% or more. If the water absorption is less than 5%, the change in physical properties of the polymer film is too small, and the flexibility of the film when applied to a skin is not sufficiently improved. On the other hand, if the water absorption is high, specifically when it exceeds 200%, the film strength extremely lowers, and the film surface becomes tacky. Further, if film size deforms, particularly when it becomes larger, there may arise the problem that wrinkles occur. For this reason, it is preferable to adjust the water absorption of the polymer film finally obtained to 5 to 200%.

Considering the mechanical strength of the substrate film for an adhesive sheet, it is preferable to adjust the physical properties of the film such that the tensile modulus of elasticity in a saturated water content state is 50% or less of the tensile modulus of elasticity in a dry state. In the present invention, it is intended to impart the film with a flexibility by absorption of water by the hydrophilic polymer. Therefore, if the tensile modulus of elasticity in a saturated water content state is larger than 50% of the tensile modulus of elasticity in a dry state, the film fails to have a sufficient flexibility and skin follow-up property. More specifically, it is preferable that the film has a ratio of tensile modulus of elasticity (when it absorbs water /when it is dry) is 50% or less, a tensile modulus of elasticity when it absorbs water of 0.1 to 12 MPa, and a tensile modulus of elasticity when it is dry of 12 to 150 MPa. By setting the mechanical characteristics (tensile modulus of elasticity) to those ranges, an adhesive sheet can be produced that sufficiently meets the processability requires in producing an adhesive sheet in a dry state and ease of handling just before application, and also while it is applied to the skin, i.e., it is in a wet state, the sheet follows up delicate stress, i.e., elongation and contraction by bending or stretching arm or opening or closing the hand, and good adhesion feeling is obtained. Further, since the film has a sufficient tensile modulus of elasticity in a dry state, it is not necessary to temporarily support on a supporting film or a supporting sheet.

The inorganic fine particles to be dispersed in the elastomer resin used in the substrate film for an adhesive sheet according to the second embodiment of the present invention are not particularly limited, and particles used as fillers for plastics may generally be used. Examples of the inorganic fine particles include alumina, aluminum hydroxide, calcium carbonate, barium sulfate, titanium oxide, silica, zeolite, talc, kaolin, and acid clay. Further, for the purpose of, for example, improving the dispersibility of the inorganic fine particles in the elastomer resin, surface-treated products of those materials can also be used.

Of those inorganic fine particles, zeolite and amorphous silica are particularly suitably used. The reason for this is that from high moisture adsorption property of zeolite and amorphous silica, even if they are dispersed in the elastomer resin in large amounts as compared with other inorganic fine particles, high moisture permeability inherently possessed by the elastomer resin is not lost, and in this regard, zeolite and amorphous silica are particularly suitable when the sheet is used in for skin adhesion.

In general, zeolite is a general name of aluminosilicate having a three-dimensional skeleton structure, and is represented by the formula: $xM_{2/n}O.Al_2O_3.ySiO_2.zH_2O$, wherein M represents an ion-exchangeable ion, and is generally monovalent or polyvalent metal ion; n represents the number of valence of the ion-exchangeable ion (metal ion); x and y represent the number of moles of metal oxide and silica, respectively; and z represents the number of moles of water of crystallization.

In the present invention, any natural zeolites and synthetic zeolites can be used. Examples of the natural zeolite include mordenite, ellionite, and clinobutyrolite. Examples of the synthetic zeolite include type A zeolite, type X zeolite, type Y zeolite, and type T zeolite. Those zeolites can be used alone or as mixtures of two or more thereof.

As described above, ion M which forms a crystal structure is generally monovalent or polyvalent metal ion. Examples of the monovalent ion which can be used include Na ion and Ag ion. Examples of the divalent ion which can be used include Zn ion, Cu ion, Mg ion, and Ca ion. Of course, a trivalent metal ion may be used, and for example, Al ion can be used.

Amorphous silica means silicon dioxide having no crystalline structure and comprising porous gell-like particles having a large inner surface area. In the present invention, as the method for synthesizing amorphous silica, any method may be used regardless of whether it is a dry method or a wet method.

It is necessary for the inorganic fine particles to have an average particle size of 15 μm or less, preferably 5 μm or less. If the average particle size of the inorganic fine particles exceeds 15 μm, dispersibility of the fine particles lowers, and structure of the film becomes heterogeneous, so that film strength extremely lowers. Further, since precipitation of the inorganic fine particles on the film surface is excess to increase surface roughness, such a film is not allowable in the points of processability, handling property and feeling of the film, thus becoming unsuitable film. The average particle size used herein means a value measured by a Coulter counter.

The amount of the inorganic fine particles blended in the present invention is 8 to 100 parts by weight, preferably 15 to 60 part by weight, per 100 parts of the elastomer resin. If the amount of the inorganic fine particles blended exceeds 100 parts by weight, the tensile strength and elongation of the film after molding are lower, and such a film becomes unsuitable as a support for skin adhesion from the standpoints of processability and handling property. On the other hand, if the amount of the inorganic fine particles blended is less than 8 parts by weight, the originally aimed effect of dispersing the fine particles, such as an improvement in handling property upon adhering due to a decrease in tensile strength or an increase of tensile modulus of elasticity, is not almost perceived.

Further, in addition to the above-described inorganic fine particles, common additives added to general films, such as crosslinking agents, plasticizers, stabilizers, ultraviolet absorbents, pigments or coloring materials, can be added to the film of the present invention for the purpose of, for example, adjusting its physical properties.

Various conventional methods can be used as the method of forming the film by dispersing the inorganic fine particles in the elastomer resin. Examples of the method which can be used include a method of dissolving an elastomer in a solvent, dispersing fine particles in the resulting solution using a disper or a homomixer, and forming a film by casting, and a method of heating an elastomer with a kneading machine such as a kneader or a twin-screw extruder to convert it in a molten state, dispersing fine particles in the molten resin to obtain a masterbatch, and then melt extruding the masterbatch by T-die method or inflation method to form a film.

The elastomer film thus obtained is preferably adjusted to have a tensile strength of 12 to 28 MPa. If the tensile strength is smaller than 12 MPa, the elastomer film is easily cut. As a result, it becomes difficult to process the film, and there is the tendency that the handling property at operation becomes poor. On the other hand, if the tensile strength exceeds 28 MPa, cutting property by hands may become poor, so that such a film may be unsuitable.

The thickness of the substrate films for an adhesive sheet thus formed according to the first and second embodiments of the present invention is not particularly limited. However, where the substrate film for a pressure-sensitive adhesive sheet is used for skin adhesion, it is preferable for the film to have a thickness of 20 to 90 μm from the standpoints of handling property and follow-up property to a skin during and after its application.

The adhesive sheet of the present invention is characterized in that an adhesive layer is provided on at least one surface, i.e., one surface or both surfaces, of the substrate film for an adhesive sheet of the present invention.

The adhesive used for the adhesive layer is not particularly limited, and various conventional adhesives can be used. Examples of the adhesive that can be used include acrylic adhesives, rubber-based adhesives, and silicone-based adhesives. Where the adhesive is used to form a pressure-sensitive adhesive sheet for skin adhesion, it is preferable to select a pressure-sensitive adhesive which seldom causes a skin rash. Acrylic adhesives are particularly preferable. To this effect, it is suitable to use an adhesive adjusted to have an adhesive force to a skin of 40 to 150 g/20 mm.

It is preferable in the present invention that the adhesive will not prevent the perspiration from a skin and the moisture in the adhesive or evaporated from a skin can effectively migrate in the substrate. Therefore, it is generally desirable that the adhesive has a moisture permeability of 300 $g/(m^2 \cdot 24$ hours) or more.

EXAMPLES

The present invention is described in more detail by reference to the following examples, but the invention should be not construed as being limited thereto. Unless otherwise indicated, all parts, percents and the like are by weight.

Example 1

To 320 g of 25% N,N-dimethylformamide (hereinafter referred to as "DMF" for simplicity) solution of a polyether polyurethane (trade name: ELASTOLLAN OH3-37, a product of Takeda Badische Urethane Industry Co.) as an elastomer resin was added 100 g of 20% DMF solution of polyvinyl pyrrolidone (trade name: LUVISCOL K-90, a product of BASF) as a hydrophilic polymer, and the resulting mixture was mixed with a stirrer for 10 minutes.

The mixed solution of the resins was cast on a surface of a polyester film which surface had been release-treated with a silicone, to a dry thickness of 50 μm, and dried in a hot air drier at 160° C. for 5 minutes to form a substrate film for an adhesive sheet. An acrylic pressure-sensitive adhesive having a thickness of 30 μm was directly coated to this substrate sheet to form a pressure-sensitive adhesive layer. Thus, a pressure-sensitive adhesive sheet was obtained. A tensile modulus of elasticity of the elastomer resin was 12.5 MPa, and a tensile modulus of elasticity of the polyvinyl pyrrolidone (hereinafter referred to as "PVP" for simplicity) was 100 MPa or more.

Example 2

To 360 g of 30% DMF solution of a polyether polyurethane (trade name: RESAMINE P-210, a product of Dainichiseika Color & Chemicals Mfg. Co., Ltd.) as an elastomer resin was added 60 g of 20% DMF solution of polyvinyl pyrrolidone (trade name: LUVISCOL K-90, a product of BASF) as a hydrophilic polymer, and the resulting mixture was stirred with a stirrer for 10 minutes.

A substrate film for a pressure-sensitive adhesive sheet and a pressure-sensitive adhesive sheet were obtained in the same manner as in Example 1. A tensile modulus of elasticity of the elastomer resin was 9.3 MPa, and a tensile modulus of elasticity of PVP was 100 MPa or more.

Comparative Example 1

A substrate film for a pressure-sensitive adhesive sheet was formed in the same manner as in Example 1 except that 25% DMF solution of a polyether polyurethane (trade name: ELASTOLLAN OH3-37, a product of Takeda Badische Urethane Industry Co.) was used as an elastomer resin and the hydrophilic polymer was not added. An acrylic pressure-sensitive adhesive having a thickness of 30 μm was directly coated to the substrate film for a pressure-sensitive adhesive sheet thus obtained in the same manner as in Example 1 to form a pressure-sensitive adhesive layer. Thus, a pressure-sensitive adhesive sheet was obtained. Comparative Example 2

Using 30% DMF solution of a polyether polyurethane (trade name: RESAMINE P-210, a product of Dainichiseika Color & Chemicals Mfg. Co., Ltd.) as an elastomer resin, a substrate film for a pressure-sensitive adhesive sheet and a pressure-sensitive adhesive sheet were obtained in the same manner as in Comparative Example 1.

Comparative Example 3

Using a flexible vinyl chloride film (a product of Mitsubishi Chemical MKV Company) having a thickness of 85 μm as it is, a pressure-sensitive adhesive sheet was obtained in the same manner as in Comparative Example 1.
Tests for Evaluating Physical Properties Using the substrate films for a pressure-sensitive adhesive sheet and the pressure-sensitive adhesive sheets obtained in Examples 1 and 2 and the substrate films for a pressure-sensitive adhesive sheet and the pressure-sensitive adhesive sheets obtained in Comparative Examples 1 to 3, physical properties thereof were evaluated as follows.

(Mechanical property)

Each film obtained above was used alone, and a tensile test when it is dry or it has absorbed water was conducted. The test was according to JIS K-7113, and each film sample cut into a size having a width of 20 mm and a length of 60 mm was fixed to a tensile tester with a chuck distance of 20 mm. The test was conducted under conditions of a pulling rate of 300 mm/min, a temperature of 23° C. and a humidity of 60% RH, and various physical property values (tensile modulus of elasticity (MPa), tensile strength (MPa) and elongation at break (%)) were measured. The tensile modulus of elasticity was calculated according to the definition of JIS K-7113.

For the measurement in a dry state, films which were allowed to stand in an atmosphere of 23° C. and 30% RH for 24 hours were used. For the measurement after water absorption, films were dipped in distilled water maintained at 40° C. for 60 minutes such that the surface of the films did not overlap each other. Thereafter, the films were taken out of the distilled water, and water on the surface of the films was removed with a filter paper. The films thus treated were used for measurement. Each film was in a water saturated state when the film was dipped in distilled water for 60 minutes.

(Evaluation of water absorption property)

Each film was allowed to stand in an atmosphere of 23° C. and 60% RH for 24 hours, and cut into a size having a width of 20 mm and a length of 40 mm. Weight (Wa) of the cut film was measured. Then films were dipped in distilled water maintained at 40° C. for 60 minutes such that the surface of the films did not overlap each other. Thereafter, the films were taken out of the distilled water, and water on the surface of the films was removed with a filter paper. The films thus treated were used for measurement of weight (Wb) after water absorption. Water absorption was calculated according to the following equation.

Water absorption (%)=[(Wb-Wa)/Wa]×100

(Evaluation of adhering property on curved portion)

Each pressure-sensitive adhesive sheet was cut into a size having a width of 20 mm and a length of 50 mm, and the cut sheet was wound on joint portions of hands of three sound volunteers to adhere thereon. Handling property in adhering and adhesive property of the pressure-sensitive adhesive sheet after adhering for 6 hours were evaluated.
Criterion for Handling Property in Adhering.

◎: The pressure-sensitive adhesive sheet could easily be adhered by one hand without generating wrinkles nor necessitating re-adhering.

○: The pressure-sensitive adhesive sheet could be adhered by one hand without generating wrinkles although partial re-adhering was necessary.

X: The pressure-sensitive adhesive sheet tended to cause wrinkles, and could not well be adhered. Criterion for adhesive property.

○: Edge portions of the pressure-sensitive adhesive sheet did not peel, and the pressure-sensitive adhesive sheet was entirely adhered.

X: The edge portions were partially peeled, and the adhesive property was decreased.

(Evaluation of adhered feeling)

A pressure-sensitive adhesive sheet cut into a size having a width of 20 mm and a length of 60 mm was adhered on the back of a palm, and the adhered feeling was evaluated by touching the sheet with a finger along the surface thereof. The adhered feeling was evaluated according to the following standard.

○: Touch was well smooth and there was no uncomfortable feeling.

X: There was a great abrasion resistance on the film surface and there was uncomfortable feeling.
Evaluation Results.

The evaluation results are shown in Table 1 below.

TABLE 1

|  | Film composition | | | | Physical properties in a dry state | | | Physical property after water absorption | | | Water absorption (%) | Adhering property at curved portion | | |
|---|---|---|---|---|---|---|---|---|---|---|---|---|---|---|
|  | Elastomer component | | | Hydrophilic polymer component | Mechanical property | | | Mechanical property | | | | | | |
|  | | | | | Tensile modulus of elasticity (MPa) | Tensile strength (MPa) | Elongation at break (%) | Tensile modulus of elasticity (MPa) | Tensile strength (MPa) | Elongation at break (%) | | Adhesion handling property | Adhesive property | Adhered feeling |
|  | ELASTOLLAN | RESAMIN | Vinyl chloride | PVP | | | | | | | | | | |
| Example 1 | 80 | — | — | 20 | 62.0 | 20.7 | 520 | 5.1 | 12.0 | 670 | 110 | ◎ | ○ | ○ |
| Example 2 | — | 90 | — | 10 | 31.3 | 17.0 | 550 | 4.9 | 15.1 | 810 | 20 | ◎ | ○ | ○ |

TABLE 1-continued

| | Film composition | | | | Physical properties in a dry state | | | Physical property after water absorption | | | Adhering property at curved portion | | |
|---|---|---|---|---|---|---|---|---|---|---|---|---|---|
| | Elastomer component | | | Hydrophilic polymer component | Mechanical property | | | Mechanical property | | | Water absorption Water absorption (%) | | |
| | | | | | Tensile modulus of elasticity (MPa) | Tensile strength (MPa) | Elongation at break (%) | Tensile modulus of elasticity (MPa) | Tensile strength (MPa) | Elongation at break (%) | | | |
| | ELAST-OLLAN | RESA-MIN | Vinyl chloride | PVP | | | | | | | | Adhesion handling property | Adhesive property | Adhered feeling |
| Comparative example 1 | 100 | — | — | — | 9.8 | 30.4 | 930 | 10.6 | 38.6 | 960 | 38 | × | ○ | × |
| Comparative example 2 | — | 100 | — | — | 8.8 | 32.5 | 680 | 8.1 | 36.4 | 820 | 4 | × | ○ | × |
| Comparative example 3 | — | — | 100 | — | 39.8 | 30.9 | 430 | 35.0 | 32.1 | 410 | 0 | ⊙ | × | × |

As is apparent from Table 1, the pressure-sensitive adhesive sheets obtained in Examples 1 and 2 showed good results in both the handling property in adhering and the adhesive property. Further, regarding the physical properties of those films, the tensile modulus of elasticity at saturated water absorption is 50% or less of the tensile modulus of elasticity in a dry state, and the water absorption is in a range of 5 to 200%.

Thus, it was confirmed that when the substrate film for a pressure-sensitive adhesive sheet of the present invention was used, a pressure-sensitive adhesive sheet having good handling property in adhering and also good follow-up property to a skin could be obtained.

According to the first embodiment of the substrate film for a pressure-sensitive adhesive sheet of the present invention, since the hydrophilic polymer having a tensile modulus of elasticity higher than that of the elastomer resin is blended with the elastomer resin, mechanical strength of the film obtained can sufficiently satisfy processability in producing the pressure-sensitive adhesive sheet and the handling property in adhering.

Further, by water absorption, the tensile modulus of elasticity of the film decreases, and as a result, the film becomes more flexible. Therefore, use of the substrate film for a pressure-sensitive adhesive sheet as a substrate enables to secure a sufficient mechanical strength in producing the pressure-sensitive adhesive sheet and also to provide a pressure-sensitive adhesive sheet that has an appropriate flexibility in adhering so that edge portions thereof are not easily peeled off, for example, when arms are bent.

Example 3

To 400 g of 25% DMF solution of a polyether polyurethane (trade name: RESAMINE P-210, a product of Dainichiseika Color & Chemicals Mfg. Co., Ltd.) as an elastomer resin was added 11 g of type A sodium zeolite (trade name: MIZUKALIZER DS, a product of Mizusawa Industrial Chemicals. Ltd., average particle diameter: 2.1 μm), and the resulting mixture was stirred with a homogenizer to disperse the zeolite.

The resulting dispersion solution was cast on a surface of a polyester film which surface had been release-treated with a silicone at a dry thickness of 50 μm and dried a hot air drier at 160° C. for 5 minutes to form a substrate film for a pressure-sensitive adhesive sheet.

An acrylic pressure-sensitive adhesive having a thickness of 30 μm was directly laminated on this substrate film for a pressure-sensitive adhesive sheet to obtain a pressure-sensitive adhesive sheet.

Example 4

A substrate film for a pressure-sensitive adhesive sheet and a pressure-sensitive adhesive sheet were obtained in the same manner as in Example 3 except that the amount of the type A sodium zeolite (trade name: MIZUKALIZER DS, a product of Mizusawa Industrial Chemicals. Ltd., average particle diameter: 2.1 μm) added was changed to 25 g.

Example 5

To 400 g of 25% DMF solution of a polyester polyurethane (trade name: ELASTOLLAN C85A11FG, a product of Takeda Badische Urethane Industry Co.) was added 43 g of type A sodium zeolite (trade name: MIZUKALIZER DS, a product of Mizusawa Industrial Chemicals. Ltd., average particle diameter: 2.1 μm), and the resulting mixture was stirred with a homogenizer to disperse the zeolite.

Using this dispersion solution, a substrate film for a pressure-sensitive adhesive sheet and a pressure-sensitive adhesive sheet were obtained in the same manner as in Example 3.

Example 6

A substrate film for a pressure-sensitive adhesive sheet and a pressure-sensitive adhesive sheet were obtained in the same manner as in Example 3 except that the amount of the type A sodium zeolite (trade name: MIZUKALIZER DS, a product of Mizusawa Industrial Chemicals. Ltd., average particle diameter: 2.1 μm) added was changed to 50 g.

Example 7

To 400 g of 25% DMF solution of a polyether polyurethane (trade name: trade name: ELASTOLLAN OH3-37, a product of Takeda Badische Urethane Industry Co.) as an elastomer resin was added 25 g of type A sodium zeolite (trade name: ZEOSTAR NA, a product of The Nippon Chemical Industrial Co., Ltd., average particle diameter: 3.2 $\mu$m), and the resulting mixture was stirred with a homogenizer to disperse the zeolite.

The resulting dispersion solution was cast on a surface of a polyester film which surface had been release-treated with a silicone at a dry thickness of 50 $\mu$m and dried in a hot air drier at 160° C. for 5 minutes to form a substrate film for a pressure-sensitive adhesive sheet.

An acrylic pressure-sensitive adhesive having a thickness of 30 $\mu$m was directly laminated on this substrate film for a pressure-sensitive adhesive sheet to obtain a pressure-sensitive adhesive sheet.

Example 8

A substrate film for a pressure-sensitive adhesive sheet and a pressure-sensitive adhesive sheet were obtained in the same manner as in Example 7 except that zeolite the surface of which having been acid-treated (trade name: SILTON AMT-25, a product of Mizusawa Industrial Chemicals. Ltd., average particle diameter: 2.5 $\mu$m) was used as an inorganic fine particle.

Example 9

A substrate film for a pressure-sensitive adhesive sheet and a pressure-sensitive adhesive sheet were obtained in the same manner as in Example 7 except that 50 g of talc (trade name: MICROACE L-1, a product of Nippon Talc K.K., average particle diameter: 2.3 $\mu$m) was used as an inorganic fine particle.

Example 10

A substrate film for a pressure-sensitive adhesive sheet and a pressure-sensitive adhesive sheet were obtained in the same manner as in Example 7 except that 50 g of talc (trade name: MS-P, a product of Nippon Talc K.K., average particle diameter: 12.5 $\mu$m) was used as an inorganic fine particle.

Example 11

A substrate film for a pressure-sensitive adhesive sheet and a pressure-sensitive adhesive sheet were obtained in the same manner as in Example 7 except that 50 g of fused silica (trade name: FB-35, a product of Denki Kagaku Kogyo K.K., average particle diameter: 13.0 $\mu$m) was used as an inorganic fine particle.

Comparative Example 4

A substrate film for a pressure-sensitive adhesive sheet and a pressure-sensitive adhesive sheet were obtained in the same manner as in Example 3 except that 25% DMF solution of a polyether polyurethane (trade name: RESAMIN P-210) was used alone as an elastomer resin and an inorganic fine particle was not added.

Comparative Example 5

A substrate film for a pressure-sensitive adhesive sheet and a pressure-sensitive adhesive sheet were obtained in the same manner as in Comparative Example 4 except that 25% DMF solution of a polyester polyurethane (trade name: ELASTOLLAN C85A11FG) was used as an elastomer resin.

Comparative Example 6

A substrate film for a pressure-sensitive adhesive sheet and a pressure-sensitive adhesive sheet were obtained in the same manner as in Comparative Example 4 except that 25% DMF solution of a polyether polyurethane (trade name: ELASTOLLAN OH3-37) was used as an elastomer resin.

Comparative Example 7

A substrate film for a pressure-sensitive adhesive sheet and a pressure-sensitive adhesive sheet were obtained in the same manner as in Example 3 except that the amount of the type A sodium zeolite (trade name: MIZUKALIZER DS) added was changed to 3 g.

Comparative Example 8

A substrate film for a pressure-sensitive adhesive sheet and a pressure-sensitive adhesive sheet were obtained in the same manner as in Example 3 except that the amount of the type A sodium zeolite (trade name: MIZUKALIZER DS) added was changed to 6 g.

Comparative Example 9

A substrate film for a pressure-sensitive adhesive sheet and a pressure-sensitive adhesive sheet were obtained in the same manner as in Example 3 except that the amount of the type A sodium zeolite (trade name: MIZUKALIZER DS) added was changed to 200 g.

Comparative Example 10

A substrate film for a pressure-sensitive adhesive sheet and a pressure-sensitive adhesive sheet were obtained in the same manner as in Example 7 except that 50 g of fused silica (trade name: FB-74, a product of Denki Kagaku Kogyo K.K., average particle diameter: 31.0 $\mu$m) was used as an inorganic fine particle.

Example 12

A substrate film for a pressure-sensitive adhesive sheet and a pressure-sensitive adhesive sheet were obtained in the same manner as in Example 7 except that 25 g of amorphous silica (trade name: MIZUKASIL P-707, a product of Mizusawa Industrial Chemicals. Ltd., average particle diameter: 2.2 $\mu$m) was used as an inorganic fine particle, and were evaluated.

Example 13

A substrate film for a pressure-sensitive adhesive sheet and a pressure-sensitive adhesive sheet were obtained in the same manner as in Example 7 except that 25 g of amorphous silica (trade name: MIZUKASIL P-526N, a product of Mizusawa Industrial Chemicals. Ltd., average particle diameter: 3.0 $\mu$m) was used as an inorganic fine particle, and were evaluated.

Test for Evaluating Physical Properties

Using the substrate films for a pressure-sensitive adhesive sheet and the pressure-sensitive adhesive sheets obtained in the above Examples and Comparative Examples, the following evaluation tests were conducted. The results obtained are shown in Table 3 below. Further, Table 2 shows blending compositions of the above substrate films for a pressure-sensitive adhesive sheet.

(Evaluation of mechanical property)

A tensile test was conducted according to JIS K-7311. Specifically, a sample film was cut into a size having a width of 20 mm and a length of 60 mm, and the cut film was fixed to a tensile tester with a chuck distance of 20 mm. The film was pulled at a pulling rate of 300 mm/min under conditions of 23° C. and 60% RH, and a tensile modulus of elasticity (MPa), an elongation (%) and a tensile strength (MPa) were determined. The tensile modulus of elasticity was calculated according to the definition of JIS K-7113.

(Evaluation of moisture permeability)

Distilled water (20 ml) was introduced into a weighing bottle having a diameter of 40 mm, and an opening of the bottle was covered with a sample film and fixed. The weighing bottle was stored in an atmosphere of 40° C. and 30% RH for 24 hours, and a moisture permeability was measured from water loss weight in the weighing bottle.

(Evaluation of cutting by hands)

A pressure-sensitive adhesive sheet cut into a size having a width of 20 mm and a length of 60 mm was torn with hands in a width direction without elongating in a lengthwise direction, and a degree of breakage was evaluated. At this time, when the sheet could be cut linearly, it was evaluated as "○", and when the sheet elongated and could not be cut, it was evaluated as "X".

(Evaluation of handling property)

A pressure-sensitive adhesive sheet cut into a size having a width of 20 mm and a length of 60 mm was adhered on the back of a palm, and a handling property at this time was evaluated. When the sheet could easily be adhered on the back by one hand without causing wrinkles nor necessitating re-adhering, it was evaluated as ⊚, when the pressure-sensitive adhesive sheet could be adhered by one hand without causing wrinkles although partial re-adhering was necessary, it was evaluated as ○, and when the sheet tended to form wrinkles and could not well be adhered by one hand, it was evaluated as X.

(Evaluation of adhered feeling)

A pressure-sensitive adhesive sheet cut into a size having a width of 20 mm and a length of 60 mm was adhered on the back of a palm, and the adhered feeling was evaluated by touching the sheet with a finger along the surface thereof. When the touch is well smooth and there was no uncomfortable feeling, it was evaluated as ○, and when there was great abrasion resistance on the film surface and there was uncomfortable feeling, it was evaluated as X.

TABLE 2

| | Elastomer | Inorganic fine particle | Blending ratio (weight ratio) | Average particle diameter (μm) |
|---|---|---|---|---|
| Comparative example 4 | P-210 | — | — | — |
| Comparative example 5 | C85A11FG | — | — | — |
| Comparative example 6 | OH3-37 | — | — | — |
| Comparative example 7 | P-210 | Zeolite | 100/3 | 2.1 |
| Comparative example 8 | P-210 | Zeolite | 100/6 | 2.1 |
| Example 3 | P-210 | Zeolite | 100/11 | 2.1 |
| Example 4 | P-210 | Zeolite | 100/25 | 2.1 |
| Example 5 | C85A11FG | Zeolite | 100/43 | 2.1 |
| Example 6 | P-210 | Zeolite | 100/50 | 2.1 |
| Comparative example 9 | P-210 | Zeolite | 100/200 | 2.1 |
| Example 7 | OH3-37 | Zeolite | 100/25 | 3.2 |
| Example 8 | OH3-37 | Surface-treated zeolite | 100/25 | 2.5 |
| Example 9 | OH3-37 | Talc | 100/50 | 2.3 |
| Example 10 | OH3-37 | Talc | 100/50 | 12.5 |
| Example 11 | OH3-37 | Fused silica | 100/50 | 13.0 |
| Comparative example 10 | OH3-37 | Fused silica | 100/50 | 31.0 |
| Example 12 | OH3-37 | Amorphous silica | 100/25 | 2.2 |
| Example 13 | OH3-37 | Amorphous silica | 100/25 | 3.0 |

TABLE 3

| | Physical properties of elastomer film | | | | Characteristics of pressure-sensitive adhesive sheet | | |
|---|---|---|---|---|---|---|---|
| | Tensile modulus of elasticity (MPa) | Elongation (%) | Tensile strength (MPa) | Moisture permeability (g/m² · day) | Cutting by hands | Handling property | Adhered feeling |
| Comparative example 4 | 8.8 | 680 | 32.5 | 1570 | × | × | × |
| Comparative example 5 | 14.7 | 580 | 45.1 | 790 | × | ○ | × |
| Comparative example 6 | 9.8 | 930 | 30.4 | 1820 | × | × | × |
| Comparative example 7 | 11.7 | 660 | 30.7 | 1380 | × | × | × |
| Comparative example 8 | 12.7 | 700 | 32.0 | 1310 | × | ○ | ○ |
| Example 3 | 13.2 | 640 | 25.6 | 1410 | ○ | ○ | ○ |
| Example 4 | 13.7 | 690 | 17.6 | 1890 | ○ | ○ | ○ |
| Example 5 | 28.4 | 450 | 18.6 | 1880 | ○ | ○ | ○ |
| Example 6 | 16.9 | 650 | 15.5 | 2230 | ○ | ○ | ○ |
| Comparative example 9 | 100.0 | 10 | 5.2 | 4500 | ○ | × | × |
| Example 7 | 13.7 | 720 | 15.7 | 1830 | ○ | ○ | ○ |

TABLE 3-continued

|  | Physical properties of elastomer film | | | | Characteristics of pressure-sensitive adhesive sheet | | |
| --- | --- | --- | --- | --- | --- | --- | --- |
|  | Tensile modulus of elasticity (MPa) | Elongation (%) | Tensile strength (MPa) | Moisture permeability (g/m² · day) | Cutting by hands | Handling property | Adhered feeling |
| Example 8 | 15.0 | 850 | 20.3 | 1720 | ○ | ○ | ○ |
| Example 9 | 27.5 | 730 | 17.6 | 1120 | ○ | ○ | ○ |
| Example 10 | 23.3 | 800 | 15.4 | 1240 | ○ | ○ | ○ |
| Example 11 | 16.2 | 670 | 13.2 | 1580 | ○ | ○ | ○ |
| Comparative example 10 | 13.9 | 620 | 10.4 | 1500 | ○ | ○ | × |
| Example 12 | 44.2 | 510 | 26.5 | 1610 | ○ | ⊚ | ○ |
| Example 13 | 36.1 | 600 | 27.0 | 1830 | ○ | ⊚ | ○ |

According to the second embodiment of the substrate film for a pressure-sensitive adhesive sheet of the present invention, a non-porous film is formed by dispersing 8 to 100 parts by weight of the inorganic fine particles such as zeolite in 100 parts by weight of the elastomer resin. As a result, the strength when the film is broken can be decreased to a level such that the film can easily be cut by hands, while maintaining flexibility (stress relaxing property), follow-up property and barrier property. Further, since strength at slight deformation increases, adhesion handling becomes easy even without a temporary adhering support, and further, slipperiness is imparted to the film surface. In particular, by setting the tensile strength to 12 to 28 MPa, cutting property by hands can sufficiently be secured.

By producing a pressure-sensitive adhesive sheet using such a substrate film for a pressure-sensitive adhesive sheet as a substrate and forming a pressure-sensitive adhesive layer on one or both surfaces of the film, a pressure-sensitive adhesive sheet for skin adhesion, having small uncomfortable feeling in adhering to a skin and having excellent skin adhering properties such as flexibility, follow-up property or barrier property can be provided.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A non-porous substrate film for an adhesive sheet comprising an elastomer resin and inorganic fine particles having an average particle size of 15 µm or less.

2. The substrate film for an adhesive sheet as claimed in claim 1, wherein the elastomer resin is a thermoplastic block polymer.

3. The substrate film for an adhesive sheet as claimed in claim 2, wherein the elastomer resin is at least one member selected from the group consisting of polyester polyurethane, polyether polyamide, polyether polyurethane, and polyether polyester.

4. The substrate film for an adhesive sheet as claimed in claim 1 also comprising a hydrophilic polymer having a tensile modulus of elasticity higher than that of the elastomer resin.

5. The substrate film for an adhesive sheet as claimed in claim 4, wherein the elastomer resin is a thermoplastic block polymer.

6. The substrate film for an adhesive sheet as claimed in claim 4, wherein the hydrophilic polymer is polyvinyl pyrrolidone.

7. The substrate film for an adhesive sheet as claimed in claim 4, wherein the hydrophilic polymer is contained in a weight proportion of hydrophilic polymer:elastomer resin =2:98 to 40:60.

8. The substrate film for an adhesive sheet as claimed in claim 5, wherein the hydrophilic polymer is polyvinyl pyrrolidone.

9. The substrate film for an adhesive sheet as claimed in claim 5, wherein the hydrophilic polymer is contained in a weight proportion of hydrophilic polymer:elastomer resin =2:98 to 40:60.

10. The substrate film for an adhesive sheet as claimed in claim 1, wherein the film has a water absorption of 5 to 200%.

11. The substrate film for an adhesive sheet as claimed in claim 1, wherein a tensile modulus of elasticity of the film in a saturated water absorption state is 50% or less of a tensile modulus of elasticity in a dry state.

12. The substrate film for an adhesive sheet as claimed in claim 1, wherein the inorganic fine particles are dispersed in an amount of 8 to 100 parts by weight per 100 parts by weight of the elastomer resin.

13. The substrate film for an adhesive sheet as claimed in claim 12, wherein the elastomer resin is a thermoplastic block polymer.

14. The substrate film for an adhesive sheet as claimed in claim 13, wherein the elastomer resin is at least one member selected from the group consisting of polyester polyurethane, polyether polyamide, polyether polyurethane, and polyether polyester.

15. The substrate film for an adhesive sheet as claimed in claim 13, wherein the inorganic fine particles are zeolite or amorphous silica.

16. The substrate film for an adhesive sheet as claimed in claim 13, wherein the film has a tensile strength of 12 to 28 MPa.

17. The substrate film for an adhesive sheet as claimed in claim 10, wherein the inorganic fine particles are zeolite or amorphous silica.

18. An adhesive sheet comprising an adhesive layer formed on at least one surface of the substrate film for an adhesive sheet as claimed in claim 1.

19. The adhesive sheet as claimed in claim 18, wherein the sheet is used for skin adhesion.

20. An adhesive sheet comprising an adhesive layer formed on at least one surface of the substrate film for an adhesive sheet as claimed in claim 10.

21. The adhesive sheet as claimed in claim 20, wherein the sheet is used for skin adhesion.

* * * * *